United States Patent [19]
Kulkarni et al.

[11] Patent Number: 5,862,481
[45] Date of Patent: Jan. 19, 1999

[54] INTER-TECHNOLOGY ROAMING PROXY

[75] Inventors: Sanjay Kulkarni; Samir N. Kaji, both of Plano; Susan Iskra, Richardson; Jin Chen; James G. Bender, both of Dallas; Ho Bao, Grand Prairie; Okan Azmak, Dallas, all of Tex.

[73] Assignee: Northern Telecom Limited, Quebec, Canada

[21] Appl. No.: 629,397

[22] Filed: Apr. 8, 1996

[51] Int. Cl.$^6$ ...................................................... H04Q 7/20
[52] U.S. Cl. .......................... 455/432; 455/435; 455/445
[58] Field of Search ..................................... 455/432, 435, 455/445, 448, 456, 433, 438, 439; 370/328, 331

[56] References Cited

U.S. PATENT DOCUMENTS

| | | | |
|---|---|---|---|
| H1641 | 4/1997 | Sharman | 455/466 |
| 5,325,362 | 6/1994 | Aziz | 455/432 |
| 5,440,614 | 8/1995 | Sonberg et al. | 455/432 |
| 5,497,412 | 3/1996 | Lannen et al. | 379/60 |
| 5,606,596 | 2/1997 | Jain et al. | 455/433 |
| 5,610,974 | 3/1997 | Lantto | 455/433 |
| 5,640,386 | 6/1997 | Wiedeman | 370/320 |

FOREIGN PATENT DOCUMENTS

| | | |
|---|---|---|
| 2 280 085 | 1/1995 | United Kingdom . |
| WO 95/27382 | 10/1995 | WIPO . |

OTHER PUBLICATIONS

Yasuyuki Uchiyama et al., "Network Functions and Signalling for Personal Roaming between Digital Cellular Standards," IEEE, NTT Mobile Communications Network Inc., Apr. 1995, pp. 447–451.
Akira Yamaguchi et al., "Interoperability of PDC with GSM," IEEE, Apr. 1995, pp. 452–455.
Synacom Technology, "Product Overview: RoamFree Interworking Gateway," Jan. 1, 1996.
Jorgen Lantto, "Roaming Between Cellular Standards," ISS'95, vol. 1, Apr. 1995.
The 1995 Eastern Communications Forum (no date).
Joint NT/Ericsson submission to TR 46 (no date).

*Primary Examiner*—Dwayne D. Bost
*Assistant Examiner*—Tracy M. Legree
*Attorney, Agent, or Firm*—Finnegan, Henderson, Farabow, Garrett & Dunner, L.L.P.

[57] ABSTRACT

An interworking proxy is coupled to first and second mobile switching systems and translates between first and second management protocols used by the first and second systems, respectively. The first system requests service for a mobile user using the first management protocol. The proxy receives the service request and translates it from the first management protocol to the second management protocol, and then transmits the translated service request to the second system. The second system provides a response to the service request using the second management protocol. The interworking proxy receives the response and translates it from the second management protocol to the first management protocol, and then transmits the translated response to the first system.

13 Claims, 13 Drawing Sheets

INTER-TECHNOLOGY ROAMING PROXY

BACKGROUND OF THE INVENTION

The present invention is directed to an inter-technology roaming proxy that translates and routes requests and responses between two networks having different protocols.

Conventional wireless telecommunications networks include Base Stations, Mobile Switching Centers (MSCs) equipped with Visitor Location Registers (VLRs), and Home Location Registers (HLRs) having Authentication Centers (ACs or AuCs). Each base station provides radio communications to mobile terminals located in a respective cell or zone of the wireless network. The base stations are interconnected by the MSCs which provide telecommunications switching functions. The HLR stores information related to the current location of each mobile terminal and subscriber data which define the authorized services for each mobile terminal. The VLR temporarily stores subscriber data for those mobile terminals currently located in the service area of the corresponding MSC.

When a mobile terminal is activated in a zone of the wireless network, it sends a registration request to the base station serving the zone in which it is located. The registration request includes a Mobile Identification Number (MIN), which uniquely identifies the mobile terminal. The serving base station forwards the registration request to the serving MSC, which then forwards the registration request to the HLR. The HLR searches for subscriber data corresponding to the MIN in the registration request. If the subscriber data is located, the HLR downloads that data to the VLR of the serving MSC. The serving MSC then uses the subscriber data to perform any required authentication tests and, upon finding such tests satisfied, provides the services defined by the subscriber data to the mobile terminal.

Wireless networks are connected to other wireless networks, and support mobile terminals that roam into their service areas from the service areas of other wireless networks. Subscriber data for the roaming mobile terminals is downloaded from the HLRs of their home networks to the VLR in the serving network. In North American cellular telephone systems, roaming mobile terminals send enough information to the serving MSC in the registration request to enable the serving MSC to locate and establish communications with the HLR of the mobile terminal's home network. This allows the required subscriber data to be downloaded to the VLR in the serving network.

The IS-41 standard defines the protocol North American cellular telephone systems use to locate the home HLR of a registering mobile terminal to download subscriber data for the registering terminal from the home HLR to the VLR of the serving MSC, and to authenticate the registering terminal. North American cellular, up-banded cellular, and CDMA wireless telephone systems use this protocol.

The Global System for Mobile Communication (GSM) series of standards defines a different protocol used for the same operations in most European cellular telephone systems. The PCS-1900 standard for personal communications services (PCS) in North America is based on the GSM standard.

In North America, some PCS service providers (PSPs) use the IS-41 mobility management protocol and other PSPs use the GSM mobility management protocol. To earn revenue from those subscribers who roam over large geographic regions, PSPs need to support GSM-based PCS subscribers on IS-41-based networks and IS-41-based subscribers on GSM-based networks in order to provide those subscribers with unbroken service.

To support such roaming of mobile terminals between cellular telephone systems using different mobility management protocols, conventional systems include an interworking function. The interworking function receives registration requests formatted according to the mobility management protocol used by the serving system and provides corresponding subscriber data in a format used by the VLRs and MSCs of the serving system.

One prior art technique for supporting mobile terminal roaming is discussed in an article by Jörgen Lantto, "Roaming Between Cellular Standards," ISS'95, Vol. 1, April 1995. This technique, referred to as the Ericsson technique, is demonstrated in FIGS. 1–3 for the case where a GSM terminal roams into an IS-41 service area.

As FIG. 1 shows, the Ericsson technique uses an Interworking Location Register (ILR) and an Interworking MSC (IMSC) or Gateway MSC (GMSC) to perform the required interworking functions. The ILR is a normal HLR and acts as an IS-41 HLR towards the serving IS-41 network and as a GSM MSC/VLR towards the home GSM network. The ILR contains the normal functions of an IS-41 HLR, but includes only subscriber data for roaming terminals.

FIG. 2 demonstrates the registration procedure, and FIG. 3 demonstrates the call termination procedure of the Ericsson technique. When the roaming mobile terminal realizes that it is no longer located within its home GSM network, the registration procedure of FIG. 2 occurs. The roaming terminal requests registration from the serving network via a registration request (RegReq) message (210). The serving MSC/VLR sends the registration request (RegReq) message to the ILR (220).

Upon receiving the RegReq message, the ILR authenticates the roaming terminal and stores the identification of the serving MSC/VLR (230). The ILR sends subscriber data identifying the roaming terminal to the serving MSC/VLR in the form of a registration request response (regreq) message (240). Finally, the ILR updates the home HLR to identify the IMSC as the serving MSC for the roaming terminal (250).

When an incoming call arrives at the network for the roaming terminal, it first arrives at the roaming terminal's home MSC/VLR (310). In response to the received call for the roaming terminal, the home MSC/VLR determines whether the terminal is located within its serving area. Since the terminal is roaming, the home MSC/VLR determines that the terminal is not located within its serving area.

The home MSC/VLR then requests a routing number from the home HLR by sending a routing number request (ReqRouteNo) message. The home MSC/VLR uses the routing number to route the call to the appropriate serving MSC.

The home HLR forwards the routing number request to the ILR (330), which forwards the request to the IMSC (340). The IMSC provides a routing number (RouteNo) to the ILR identifying itself as the serving MSC (350). The ILR forwards the routing number to the home MSC/VLR via the home HLR (360–370). Using this routing number, the home MSC/VLR forwards the call to the IMSC via a Public Switched Telephone Network (PSTN) (380).

Upon receiving the forwarded call, the IMSC requests a routing number from the ILR for forwarding the call to the serving system (390). The ILR transmits the request to the serving MSC/VLR (3100). The serving MSC/VLR provides a routing number in a routing number response (routeno) message to the ILR, identifying itself as the serving MSC (3110). The ILR forwards the routing number to the IMSC (3120).

Using this routing number, the IMSC forwards the call to the serving MSC/VLR via the PSTN (3130). Upon receiving the call, the serving MSC/VLR routes the call to the roaming terminal via its base station (3140).

The Ericsson technique has several disadvantages. First, certain subscriber data must be duplicated at the ILR. This not only consumes storage space, but also complicates data integrity requirements and increases messaging requirements because all copies of the subscriber data are updated simultaneously. Second, the ILR and the IMSC must be shared and operated in cooperation by the two PSPs of the interworking systems. This causes problems when the PSPs have conflicting interests. Third, the cost of providing an extra MSC dedicated to interworking, namely the IMSC, is high. Finally, routing calls through the IMSC consumes more PSTN resources and is relatively slow.

SUMMARY OF THE INVENTION

The present invention has been made in view of the above circumstances and has as an object an interworking proxy that translates and routes requests and responses between two telephone systems using different protocols. The interworking proxy solves the problems attributable to the prior art technique.

The interworking proxy (IP) of the present invention avoids the need for duplicating subscriber data, reducing storage requirements and simplifying data integrity requirements. Moreover, the present invention avoids the need for a dedicated IMSC and simplifies the routing of calls to terminals roaming in the service areas of other systems, thereby reducing the required messaging and processing, and possibly the quantity of PSTN resources consumed by each connection.

Furthermore, the present invention avoids the need for resources shared between PSPs, thus requiring less cooperation between PSPs. The present invention permits one PSP to provide an IP to support roaming of subscribers of another PSP into the service area of the first PSP, even if the second PSP does not provide reciprocal functionality to support roaming of subscribers of the first PSP into the service area of the second PSP.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the interworking proxy of this invention is coupled to first and second mobile switching systems to translate between first and second management protocols used by the first and second mobile switching systems, respectively. The first system requests service for a mobile user using the first management protocol. The proxy receives the service request and translates it from the first management protocol to the second management protocol. The proxy then transmits the translated service request to the second system.

The second system provides a response to the service request using the second management protocol. The proxy receives the response and translates it from the second management protocol to the first management protocol. The proxy then transmits the translated response to the first system.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention. In the drawings.

DETAILED DESCRIPTION OF THE PREFERRED EMBODIMENTS

IS-41 and GSM networks identify mobile terminals and subscribers in different ways. IS-41 relies on two parameters, a Mobile Identification Number (MIN) and a Mobile Serial Number (MSN), also known as an Electronic Serial Number (ESN). MIN is a 10 digit number coded in BCD form as five octets and is commonly taken to be the mobile subscriber's phone number (i.e., the number others dial to reach the mobile subscriber). MSN is a unique 32-bit number specifying the mobile terminal's electronic serial number.

In contrast, GSM relies on four parameters to identify subscribers and terminals. The first parameter is an International Mobile Subscriber Identity (IMSI). The IMSI is a 15-digit (or less) number formatted in nine octets including a length indicator. IMSI contains a Mobile Country Code (MCC—2 digits), a Mobile Network Code (MNC—2 digits), and a Mobile Subscriber Identification Number (MSIN—10 digits, or less). IMSI is stored on Subscriber Identity Module (SIM) cards, and is internal to the network, that is, subscribers normally have no knowledge of what their IMSIs are.

The second parameter is a Temporary Mobile Subscriber Identity (TMSI). The TMSI is an identifier used internally by the network in place of the IMSI to increase subscriber anonymity and security. The TMSI is only meaningful within a location area, and must be managed when a subscriber roams from one location area to another. In addition, TMSI is only four octets long, which saves bandwidth on the radio channel.

The third parameter is a Mobile Station ISDN Number (MSISDN). The MSISDN is a part of the CCITT Recommendation E.164. It contains three fields: a Country Code (CC—up to 3 digits), a National Destination Code (NDC—up to 3 digits) in lieu of an area code, and a subscriber number. The MSISDN is the number others dial to reach the mobile subscriber.

The fourth parameter is an International Mobile Equipment Identity (IMEI). The IMEI is a 15-digit identifier that contains a 6-digit Type Approval Code (TAC), a Final Assembly Code (FAC), and a serial number that uniquely identifies a mobile terminal.

The IP maps between these two sets of parameters using subscriber information stored in the IP to provide for inter-system roaming. The IP's mapping includes mapping between MIN and MSISDN, and mapping between ESN and IMEI.

In the preferred embodiment of the invention, the IP comprises two proxies: the "GSM to IS-41 Roaming Proxy" (GIP) and "IS-41 to GSM Roaming Proxy" (IGP). These proxies enable GSM subscribers to roam in cellular networks, and cellular customers to roam in GSM networks, respectively. The GIP maintains GSM network components, particularly the HLR and VLR, unaffected by the requirements of inter-system roaming. The IGP is the GIP's counterpart for IS-41 based networks.

Figure 1:
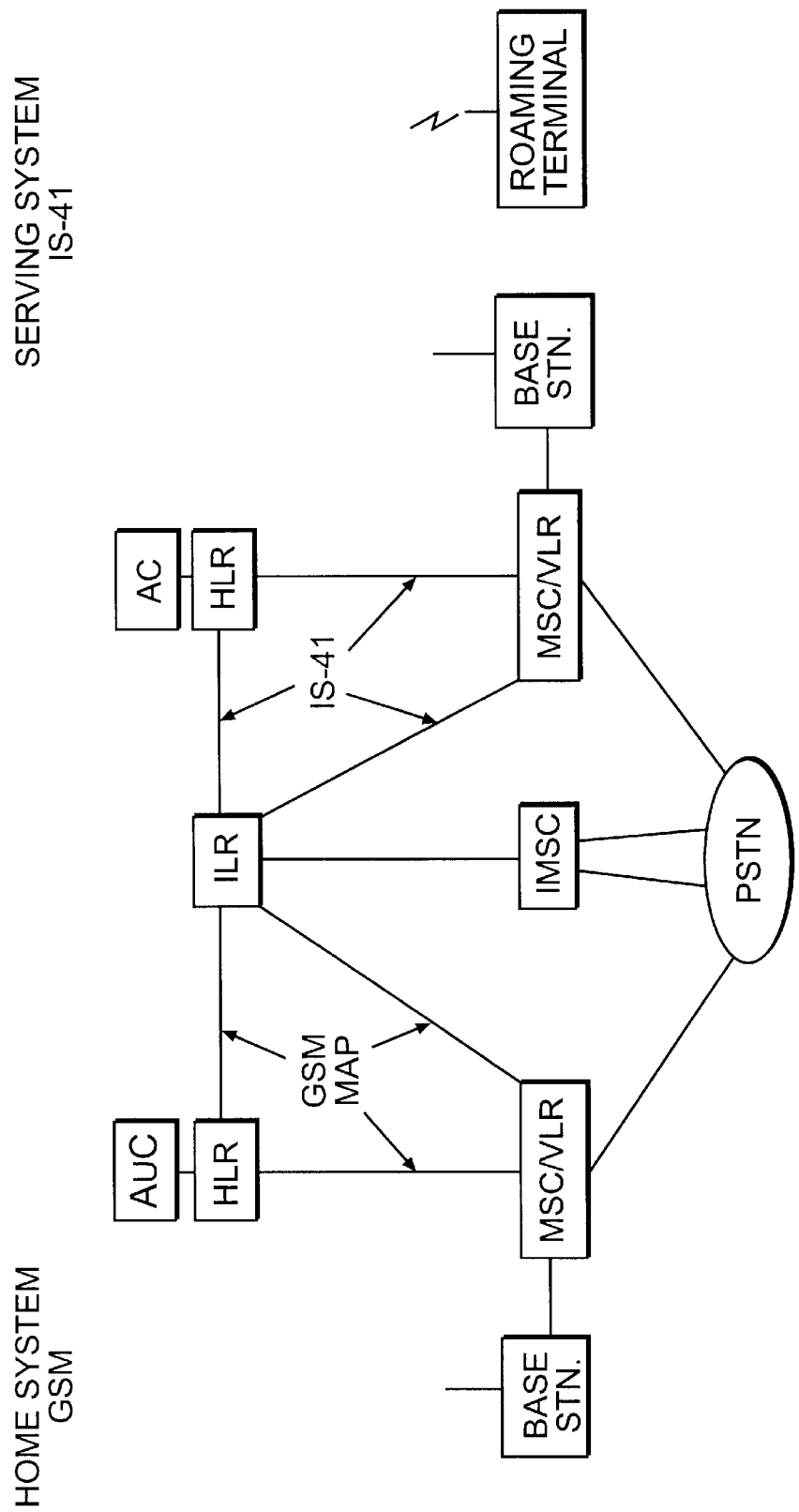
FIG. 1 is a diagram of a prior art system using the Ericsson technique.
Figure 2:
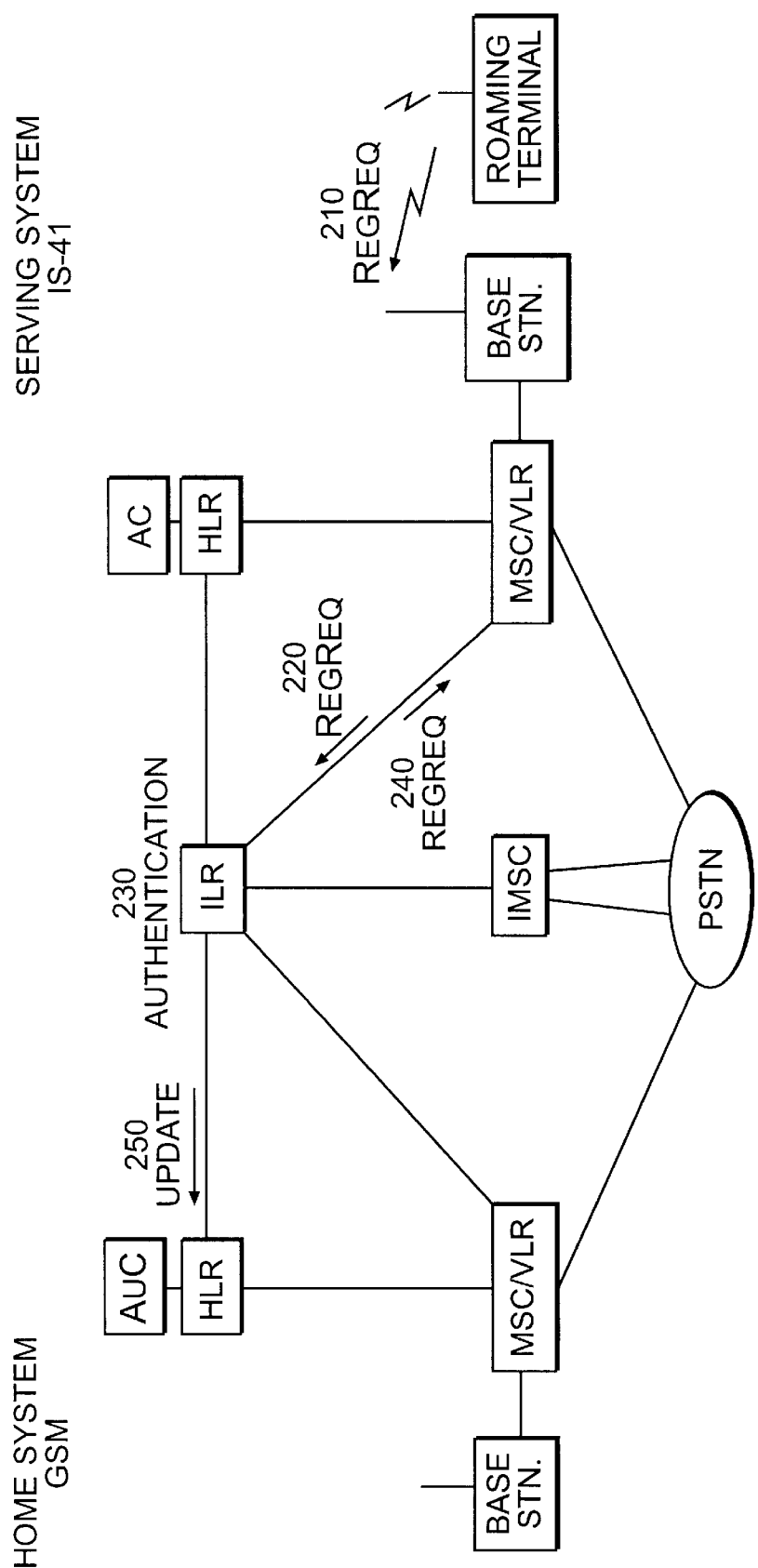
FIG. 2 demonstrates the Ericsson technique for registering a roaming terminal.
Figure 3:
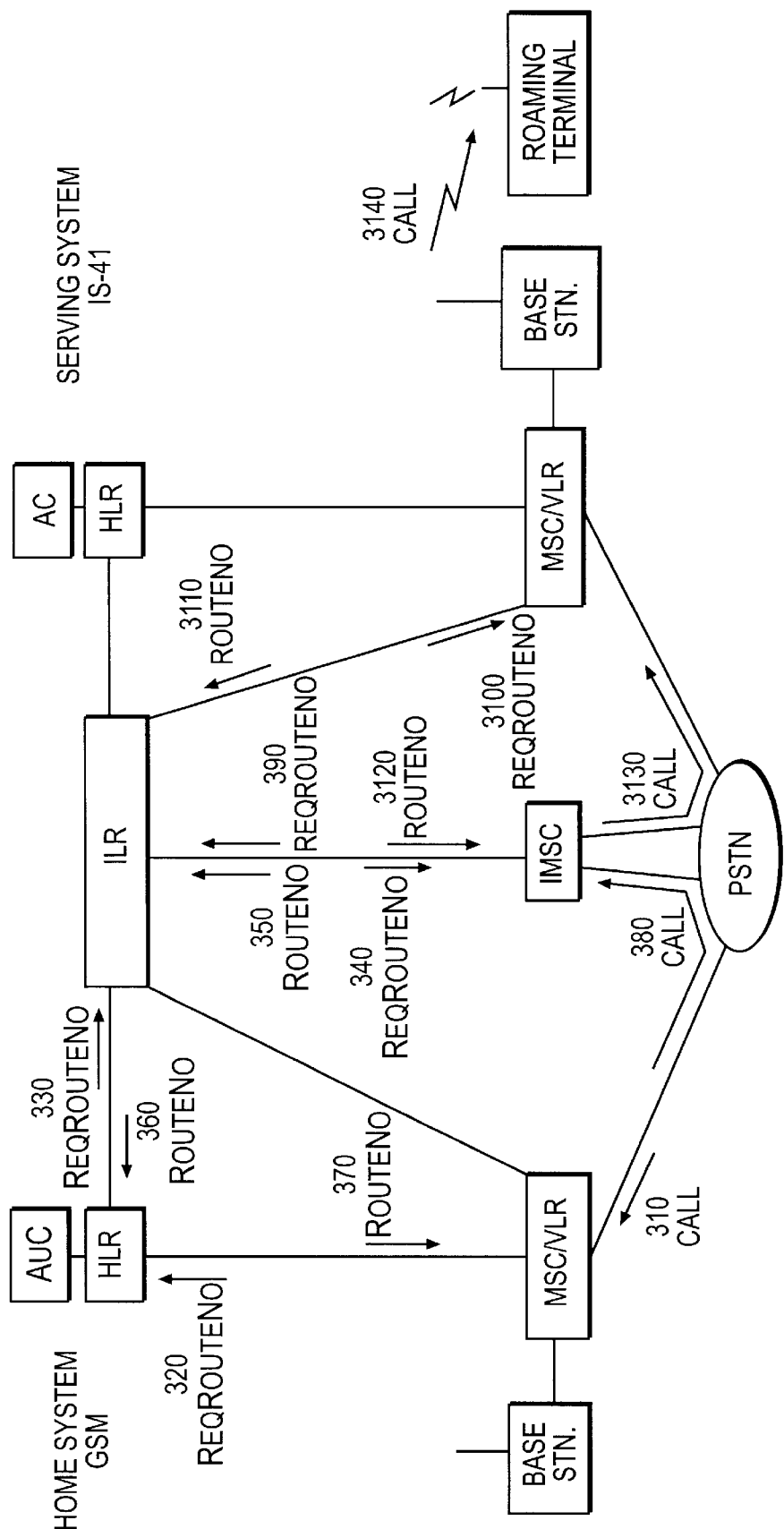
FIG. 3 demonstrates the Ericsson technique for routing a call to a roaming terminal.
Figure 4:
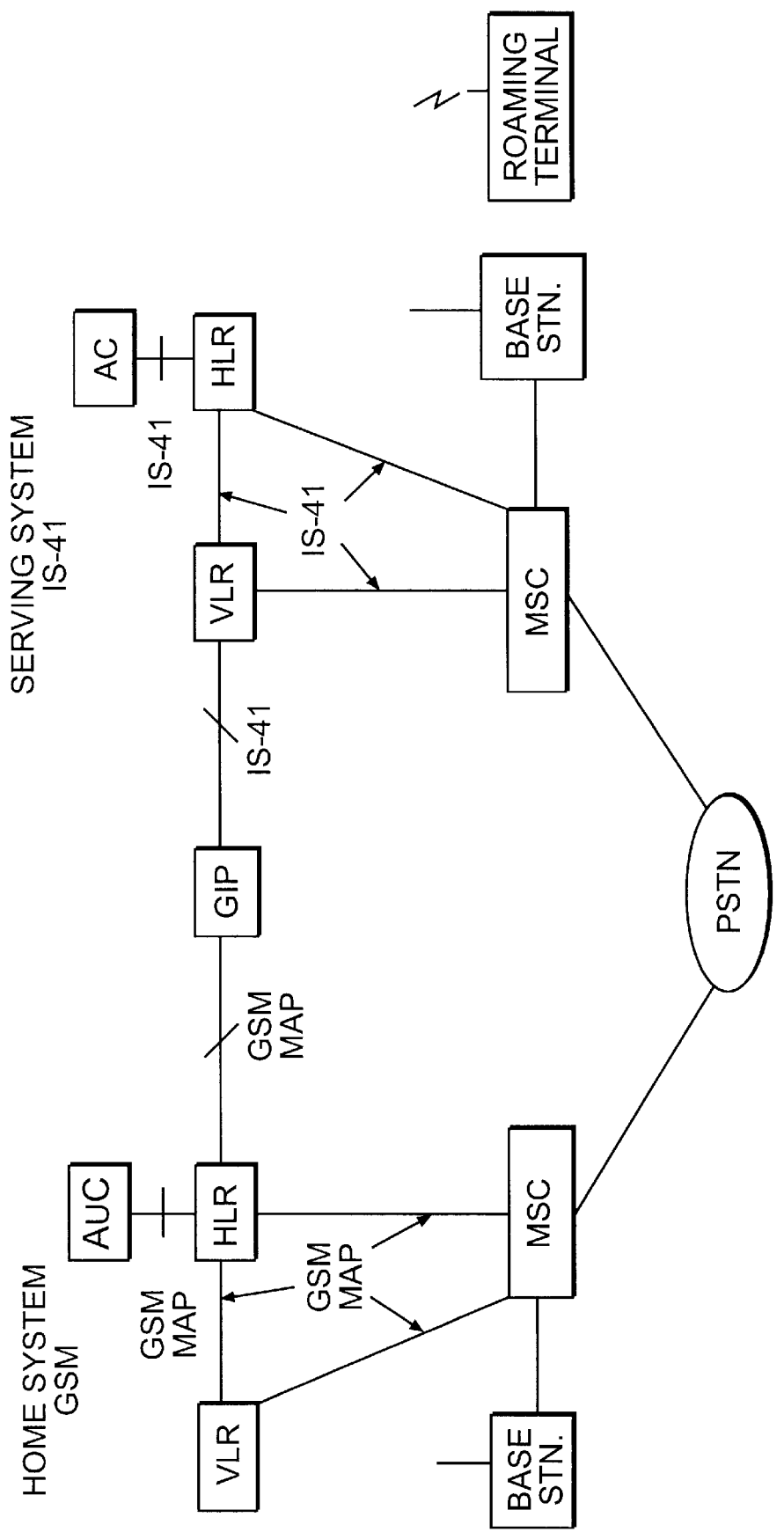
FIG. 4 is a diagram of a system of the present invention for a GSM terminal roaming in an IS-41 network.

The GIP enables GSM subscribers to roam into IS-41 networks without affecting either network infrastructure. FIG. 4 shows a block diagram providing an overview of the GIP interworking. The GIP interacts with the IS-41 VLR and the GSM HLR and supports two interfaces, IS-41 and GSM MAP. Although the figure shows the GIP as being connected to only communicate with the GSM HLR and the IS-41 VLR, the GIP can also be connected to communicate with the IS-41 MSC (e.g., see FIG. 8).

The GIP's data storage requirements are classified with respect to whether the data is set up during initial customer subscription (static) or updated while roaming (dynamic), whether the data is only generated when a GSM subscriber roams into an IS-41 network (temporary) or is maintained in conjunction with the HLR (permanent), and whether the data is stored on a per subscriber or per system basis. Tables 1A and 1B show the GIP's data storage requirements and their classification.

TABLE 1A

Subscriber Data Storage Requirements for the GIP

|  | Permanent | Temporary |
|---|---|---|
| Static | MIN | |
| | ESN | |
| | IMSI | |
| | SSD | |
| | Authorization period | |
| Dynamic | IS-41 VLR ID | Service Profile |
| | CallHistoryCount | |

TABLE 1B

System Data Storage Requirements for the GIP

|  | Permanent | Temporary |
|---|---|---|
| Static | IS-41 HLR Number | |
| | IS-41 MSC ID | |
| | GSM MSC/VLR Number | |
| Dynamic | | |

In IS-41 networks, the MIN and ESN uniquely identify a mobile subscriber. In GSM networks, the IMSI uniquely identifies the mobile subscriber. In IS-41 networks, MIN is the number others dial to reach a particular subscriber. In GSM networks, the MSISDN serves this purpose.

The GIP statically stores MIN and ESN for use in accessing IS-41 networks. It also stores a mapping between IMSI and MIN,ESN pairs. In one embodiment, ESN contains only the equipment identity from the IMEI without the Type Approval Code (TAC) or the Final Assembly Code (FAC).

The GIP also statically stores SSD (Shared Secret Data) for IS-41 authentication, and the Authorization period in IS-41. The Authorization period in IS-41 determines how long subscriber data can be considered valid. This information is stored as part of the subscriber's service profile in IS-41, and hence needs to be provided to the serving VLRs by the GIP.

The authentication process in IS-41 uses the CallHistoryCount as additional assurance against fraud. There is no corresponding parameter in GSM. Local administrative procedures at the authentication center (AC) in IS-41 define the events that increment the CallHistoryCount. These events may include initial registration, call origination, page response, or simply periodic increments. The GIP stores the CallHistoryCount to verify authenticity of a mobile terminal for a GSM subscriber during and between roaming sessions into IS-41 networks.

The GIP dynamically stores a copy of the service profile from the Home HLR of the roaming subscriber and maps it to the corresponding service profile in IS-41 while the subscriber is roaming in the IS-41 network. The mapping algorithm can be customized to each operator because each PSP may set a different mapping between GSM and IS-41 services.

The GIP stores the identity of the Serving VLR in the IS-41 network containing the roaming terminal, and a valid IS-41 HLR number to identify itself to the IS-41 network. The GIP also stores a valid IS-41 MSC ID to identify itself to the IS-41 network as the Home MSC, and a valid GSM VLR number and MSC number to identify itself to the Home GSM network.

FIGS. 5–8 show procedures according to the present invention for (1) registering a GSM terminal roaming in an IS-41 network, (2) authenticating the roaming terminal, (3) terminating a mobile call (i.e., forwarding the mobile call to the roaming terminal), and (4) redirecting a mobile call, realized by a call forward no answer condition, respectively.

Figure 5:
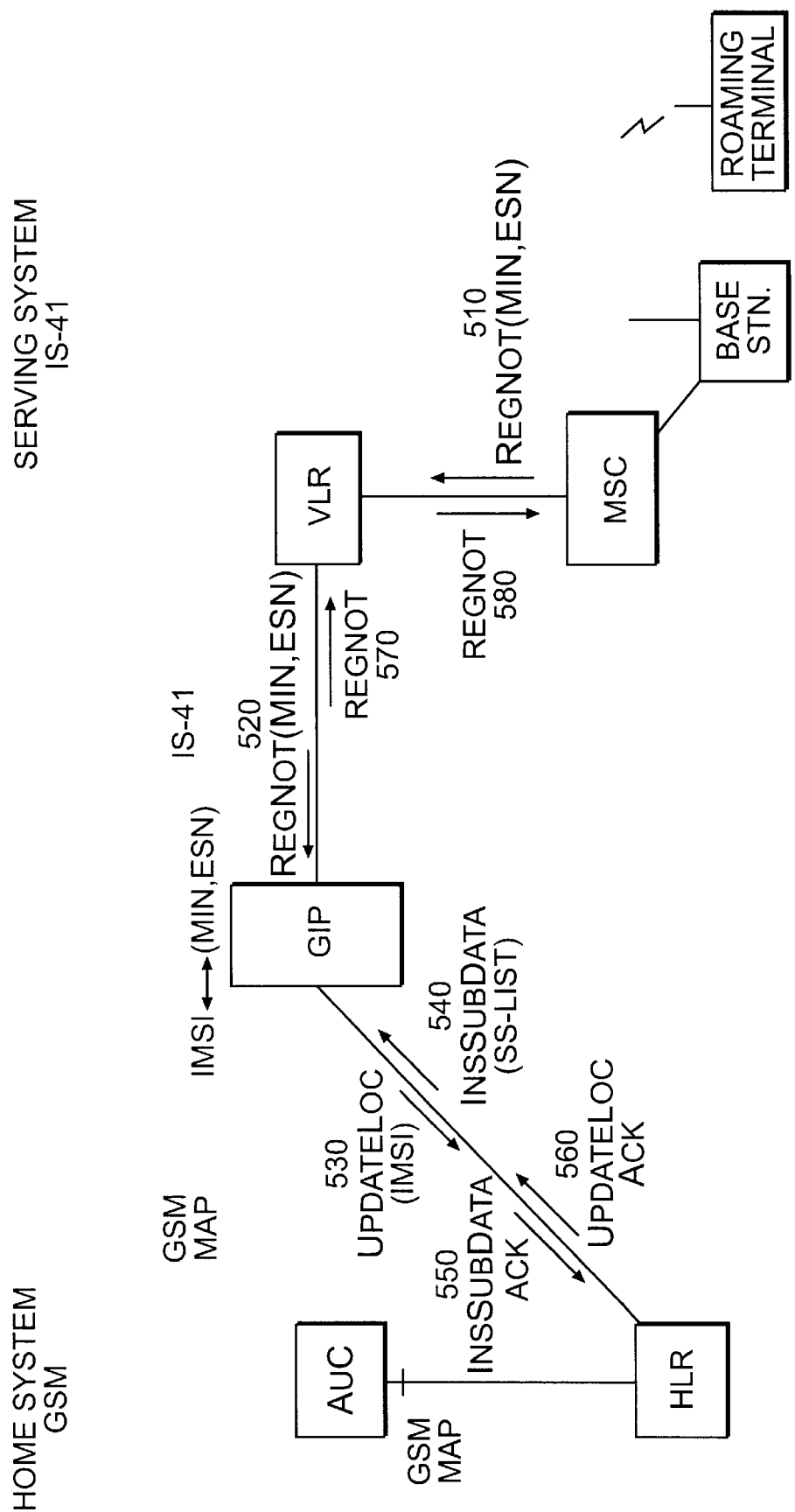
FIG. 5 demonstrates the registration procedure in the system of FIG. 4.

The registration procedure demonstrated by FIG. 5 begins when the roaming terminal realizes it can no longer communicate with its home network or, perhaps, with any other GSM network. When this happens, the roaming terminal requests registration from the IS-41 network using its MIN and ESN to identify itself to the IS-41 network. The roaming terminal can communicate with the IS-41 network via one of several emerging Common Air Interfaces (CAIs) such as Omnipoint (IS-661), CDMA, PACS, or TDMA.

Upon receiving the registration request, the Serving MSC checks its internal data structures, finds no entry for the roaming terminal, and sends a Registration Notification (RegNot) message to its associated VLR identifying the roaming terminal by its MIN and ESN (510). The Serving VLR creates a new entry in its internal data structures for the roaming terminal. It also performs Global Title Translation (GTT) to find the Home HLR associated with the roaming terminal. GTT yields the GIP's address. The Serving VLR then forwards the RegNot message to the GIP (520).

The GIP performs the necessary translation from the MIN,ESN pair to the IMSI and performs the necessary translation to locate the Home HLR for the roaming terminal. The GIP then sends a Location Update Request (UpdateLoc) message to the Home HLR, identifying itself as the Serving VLR (530).

The Home HLR forwards the service profile for the roaming terminal to the GIP in an Insert Subscriber Data (InsSubData) message (540). The GIP acknowledges successful reception of the service profile via an Insert Subscriber Data Acknowledge (InsSubDataAck) message (550). The Home HLR then updates its location register entry for the roaming terminal, and sends an Update Location Acknowledge (UpdateLocAck) message to the GIP (560).

The GIP updates its location register entry for the roaming terminal, maps the service profile from GSM service levels to those of the IS-41, and forwards the service profile to the Serving VLR, identifying itself both as the Home HLR and the Home MSC (570). The Serving VLR then informs the Serving MSC that the registration process has been successful (580).

Figure 6:
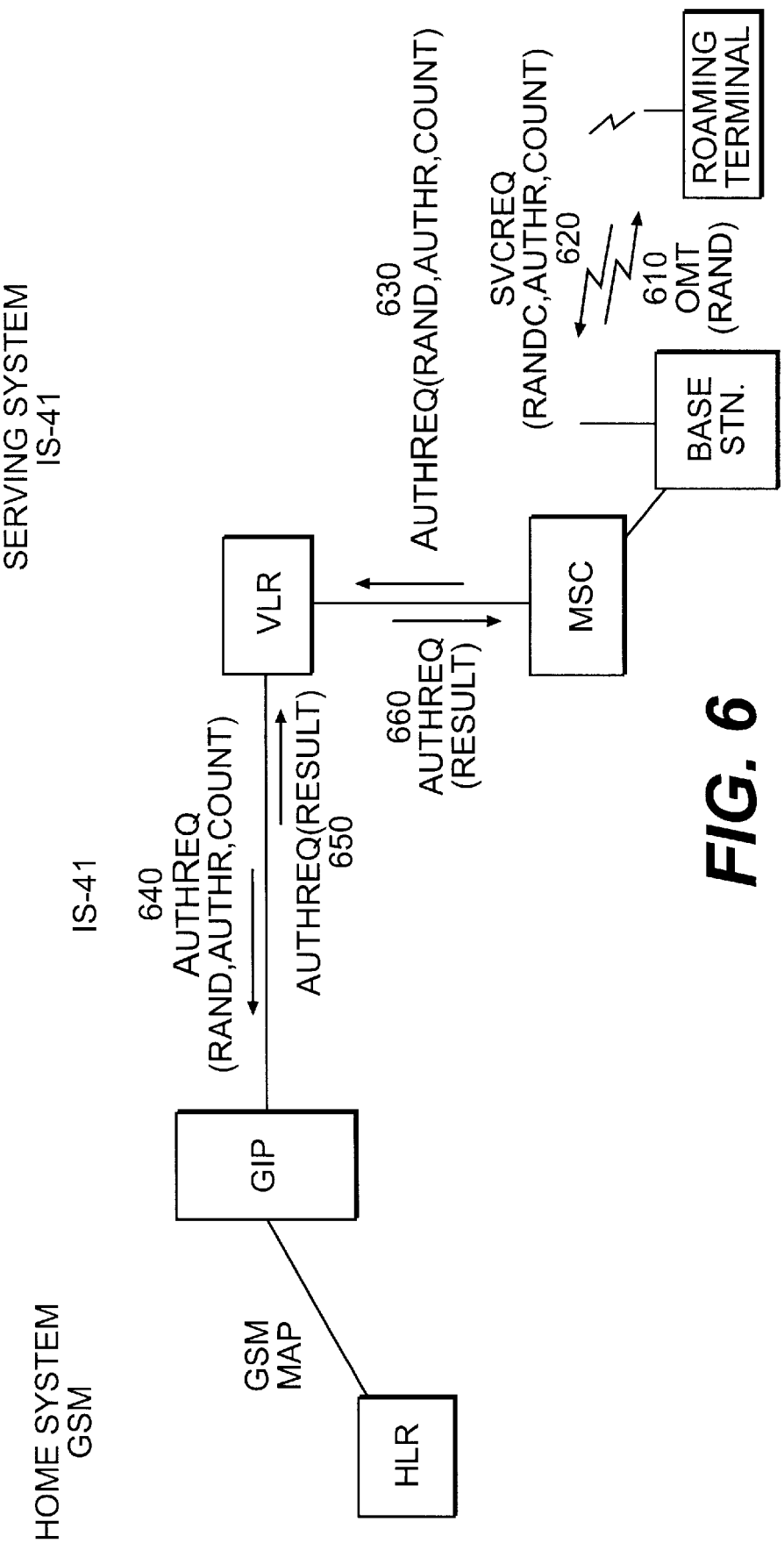
FIG. 6 demonstrates the authentication procedure in the system of FIG. 4.

When the roaming terminal later requests service for, e.g., registration, an incoming call, or an outgoing call, the authentication procedure demonstrated by FIG. 6 occurs. The GIP maintains the authentication algorithm (called the CAVE algorithm) and parameters for the IS-41 network. Therefore, the GIP does not interact with the GSM network to authenticate a GSM roaming terminal in an IS-41 network. The IS-41 network commonly uses the CAVE algorithm to perform authentication, so a discussion of the algorithm is unnecessary to enable the artisan of ordinary skill to make and use the present invention.

The Serving MSC broadcasts in an Overhead Message Train (OMT) that authentication is required (610). The OMT contains a random variable (RAND) generated by the MSC. The roaming terminal requesting service uses RAND, as well as its ESN, the most significant digit of its MIN (MIN1), and the SSD to compute an authentication response (AUTHR). The roaming terminal then sends to the Serving MSC a Service Request (svcreq) message (620) including only the most significant 8 bits of the RAND (RANDC), AUTHR, and the CallHistoryCount (COUNT) parameter.

The Serving MSC verifies the RANDC, and sends RAND, AUTHR and COUNT to the Serving VLR in an Authentication Request (AuthReq) message to be conveyed to the GIP for verification (630). The Serving VLR forwards the authentication request to the GIP (640).

The GIP executes the CAVE algorithm using the MIN1, ESN, RAND, and SSD, and compares its result with the received AUTHR value. The GIP also verifies the COUNT parameter. The GIP informs the Serving VLR whether authentication was successful (650), and the Serving VLR in turn so informs the Serving MSC (660).

Figure 7:
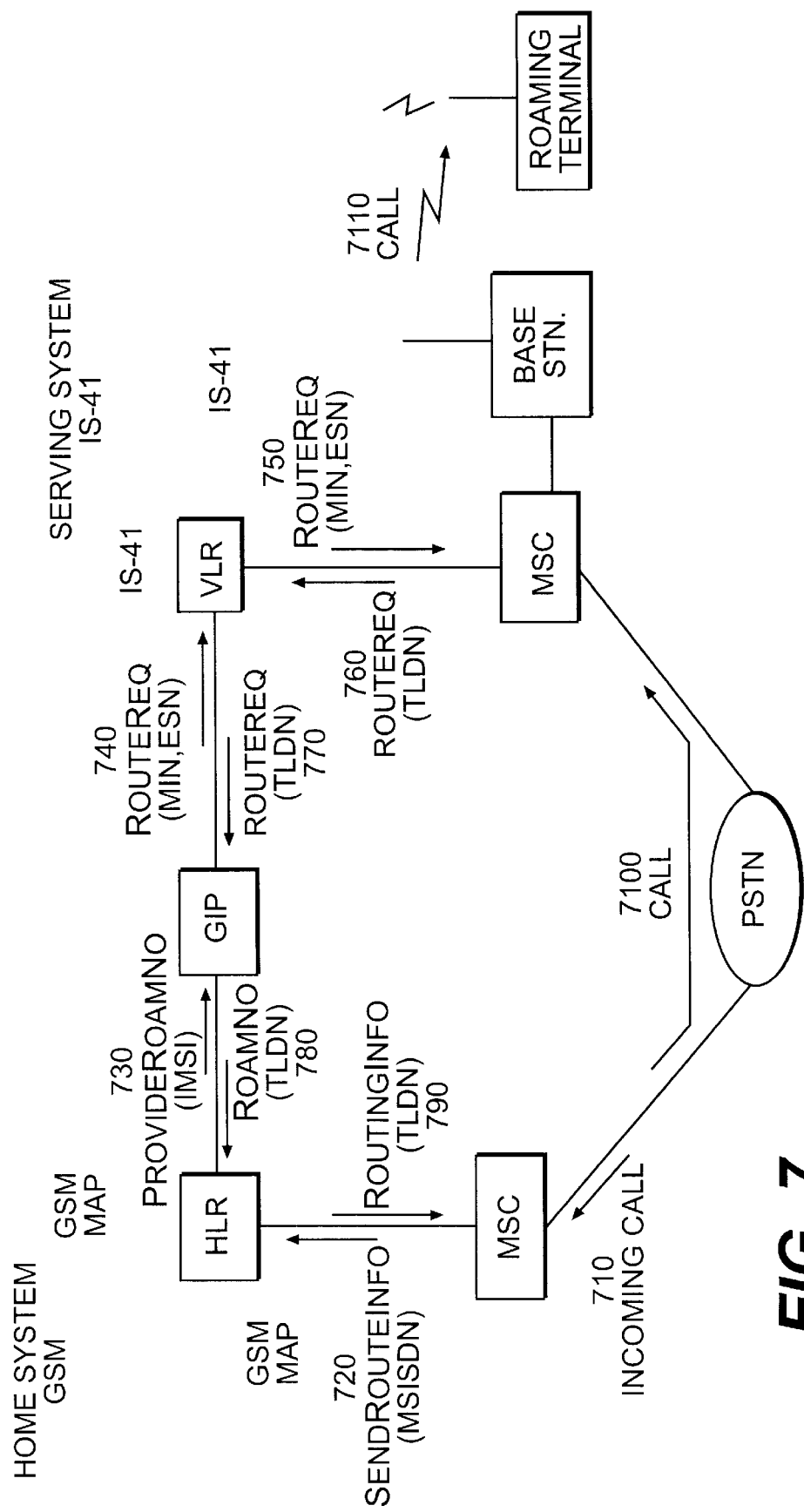
FIG. 7 demonstrates the call termination procedure in the system of FIG. 4.

When an incoming call arrives at the network for the roaming terminal, the mobile call termination procedure demonstrated by FIG. 7 occurs. Although the terminal is known to be roaming in the IS-41 network, incoming calls still first arrive at its Home MSC (710). The incoming call identifies the roaming terminal by its MSISDN.

The Home MSC requests routing information from its HLR via a Send Routing Information (SendRouteInfo) message, identifying the roaming terminal by its MSISDN (720). The Home HLR finds the IMSI corresponding to the roaming terminal based on the MSISDN, and sends a Provide Roaming Number (ProvideRoamNo) message to the last VLR to have sent an UpdateLoc message (730) (see 530 in FIG. 5). In this case, the last VLR is actually the GIP acting as the Serving VLR.

The GIP performs the necessary mapping between the IMSI and the MIN,ESN pair and sends a Routing Request (RouteReq) message to the last IS-41 VLR that sent a RegNot message (740) (see 520 in FIG. 5). The Serving IS-41 VLR forwards the routing request to the Serving MSC (750).

The Serving MSC allocates the necessary resources, and returns a Temporary Local Directory Number (TLDN) to its associated VLR (760). The Serving VLR forwards the TLDN to the GIP in a Routing Request response (routereq) message (770).

The GIP performs the necessary format conversions for the TLDN, and sends the TLDN to the Home GSM HLR in a Provide Roaming Number response (RoamNo) message (780). The Home HLR forwards the TLDN to the Home MSC (790), and the Home MSC then routes the call to the Serving MSC using the TLDN (7100). The Serving MSC forwards the call to the roaming terminal (7110).

Figure 8:
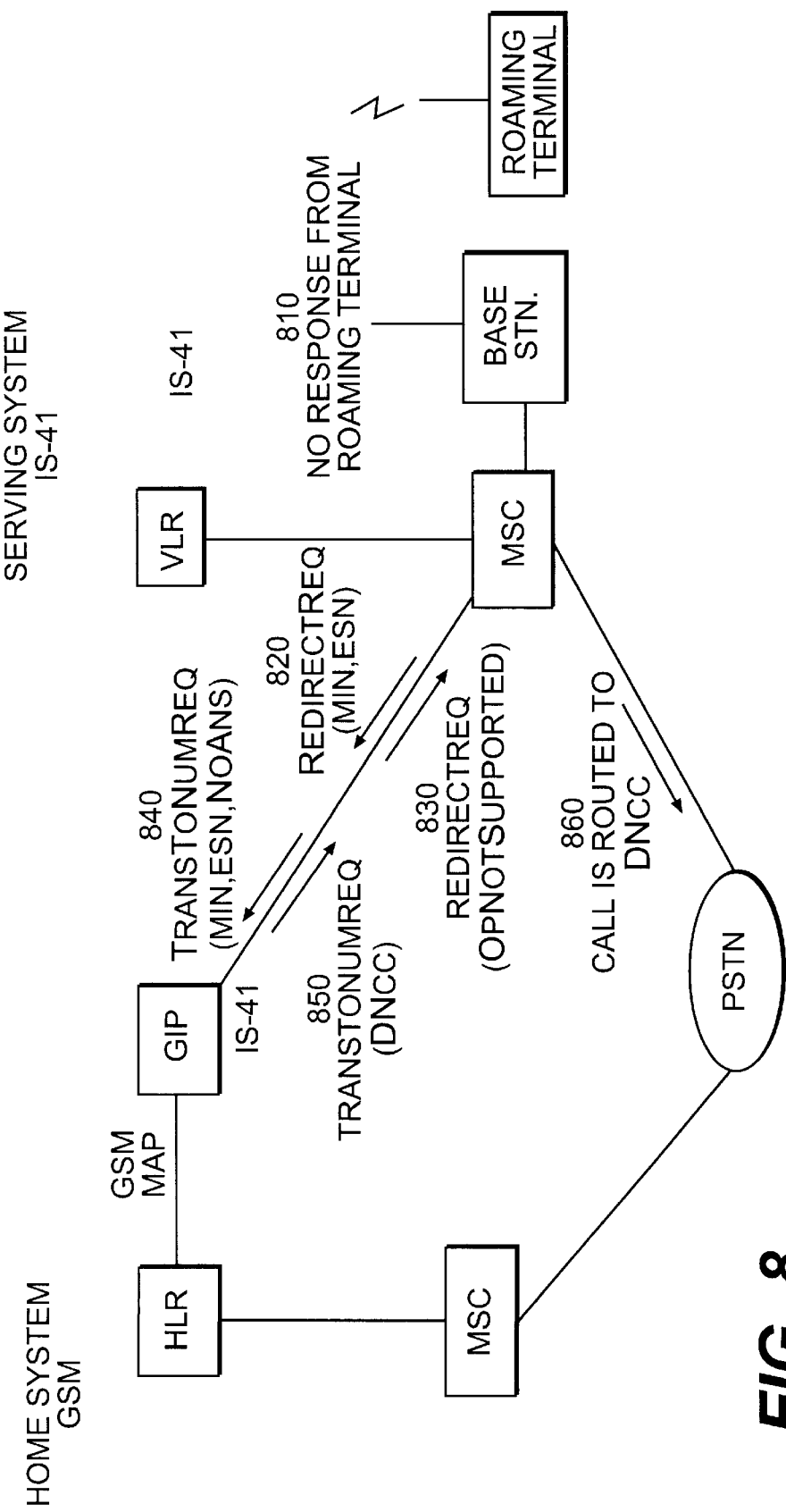
FIG. 8 demonstrates the call redirecting procedure in the system of FIG. 4.

If the roaming terminal fails to respond to the forwarded call, then the call redirection, also known as call forward no answer, procedure demonstrated by FIG. 8 occurs. When the Serving MSC determines that the roaming terminal is not responding, it tries to return the call to the Home MSC with a Redirection Request message. When the Home MSC receives this message it either (1) acknowledges the redirection request, releases the link to the Serving MSC, and handles the call redirection, or (2) declines to accept the redirection request. If the redirection request is declined, the Serving MSC requests a forward-to number from the Home MSC to perform the call redirection.

In the present invention, the GIP acts as the Home MSC. The GIP declines any redirection requests from the Serving MSC and provides the forward-to number instead. The roaming terminal of FIG. 8 does not respond to paging and/or fails to answer the forwarded call (810). Once a predetermined amount of time has passed to permit the roaming terminal an opportunity to answer, the Serving MSC sends a Redirection Request (RedirectReq) message to the GIP thinking it is the Home MSC and requesting that it handle call redirection for the roaming terminal (820).

The GIP determines that the terminal has call forwarding no answer authorized and activated, and indicates that the redirection request is rejected in a Redirection Request response (redirectreq) message sent to the Serving MSC (830). Upon notification that the redirection request was rejected, the Serving MSC requests a forward-to number by sending a Transfer-To Number Request (TransToNumReq) message to the GIP (840).

From the roaming terminal's service profile, the GIP chooses the forward-to directory number (Call Completion Directory Number, DNcc) adequate for the condition (no answer), and returns it to the Serving MSC in a Transfer-To Number Request response (transtonumreq) message (850). Upon receiving the transtonumreq message from the GIP, the Serving MSC routes the call according to the DNcc (860)

As the discussion surrounding FIGS. 4–8 shows, the GIP enables GSM subscribers to roam into IS-41 networks without affecting either network infrastructure. Because the GIP performs all inter-network translations, the two networks need only concern themselves with their own operation.

Figure 9:
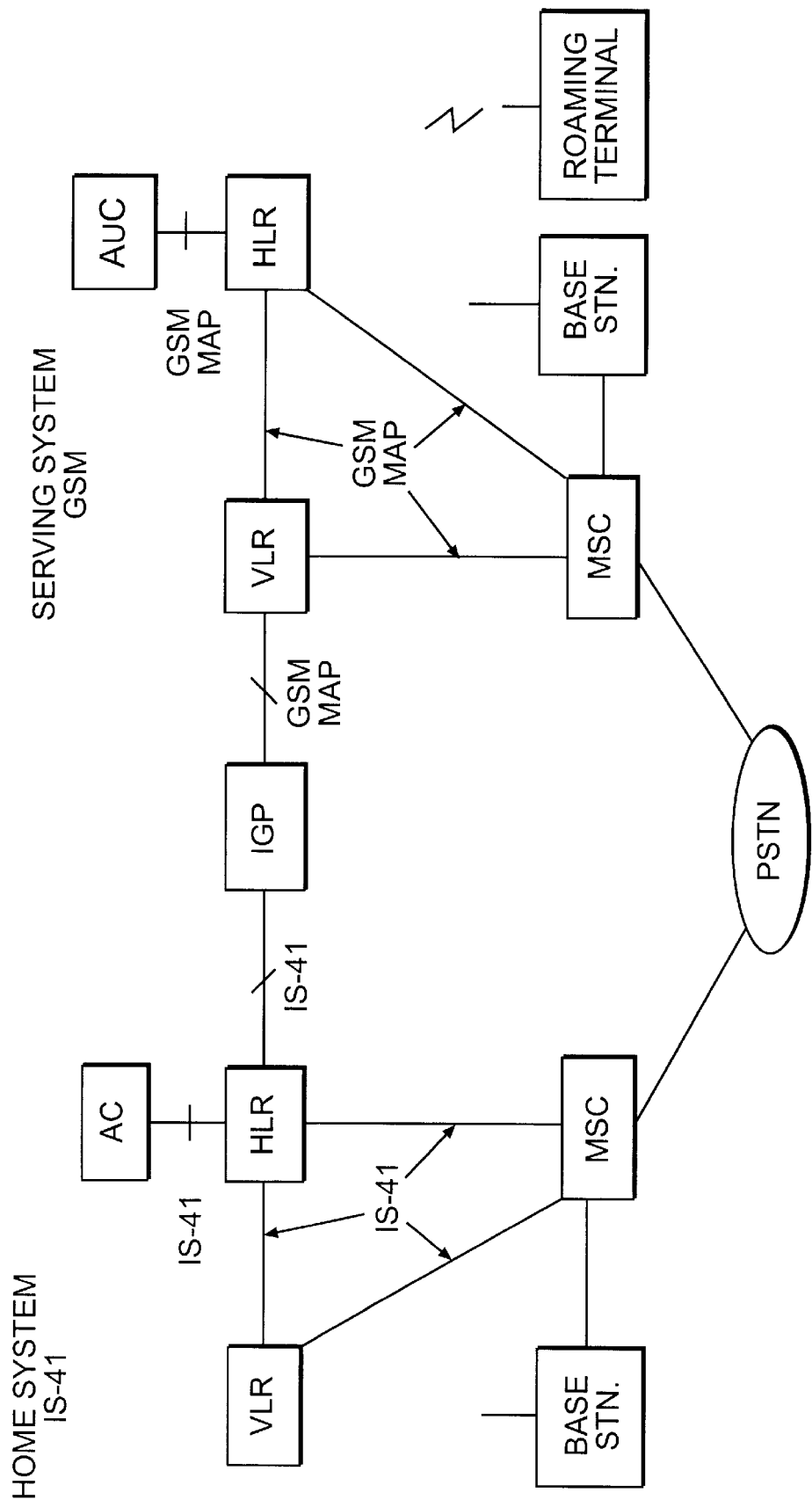
FIG. 9 is a diagram of a system of the present invention for an IS-41 terminal roaming in a GSM network.

Similar to the GIP, the IGP enables subscribers of IS-41 networks to roam into GSM networks without affecting existing network components in either network. FIG. 9 demonstrates the IGP interworking.

The IGP interacts with the IS-41 HLR and the GSM VLR via two interfaces, IS-41 and GSM MAP. Although the figure shows the IGP as connected to communicate only with the IS-41 HLR and the GSM VLR, the IGP can be connected to communicate with the GSM MSC.

The IGP's data storage requirements are classified in the same manner as the GIP's, that is, whether the data is static or dynamic, whether the data is temporary or permanent, and whether the data is stored on a per subscriber or per system basis. Tables 2A and 2B show the IGP's data storage requirements and their classification.

TABLE 2A

Subscriber Data Storage Requirements for the IGP

|  | Permanent | Temporary |
|---|---|---|
| Static | MIN | |
|  | ESN | |
|  | IMSI | |
|  | IMEI | |
|  | Ki | |
| Dynamic | GSM VLR Number | Service Profile |
|  | GSM MSC Number | |

TABLE 2B

System Data Storage Requirements for IGP

|  | Permanent | Temporary |
|---|---|---|
| Static | GSM HLR Number | |
|  | IS-41 VLR Number | |
| Dynamic | | |

The IGP dynamically stores the identification of the Serving VLR and Serving MSC of the network where the terminal is roaming. The IGP statically stores a valid HLR number to identify itself to the GSM network, and a valid Serving VLR number to identify itself to the Home IS-41 system.

The IGP retains a copy of the service profile from the Home HLR for the roaming subscriber, and maps it to corresponding basic services, teleservices, and supplementary services in the GSM network as long as the subscriber is roaming in the GSM network. The IGP also stores the parameter $K_i$ for authenticating a mobile subscriber in the GSM network. $K_i$ is also maintained at the GSM AuC.

FIGS. 10–13 demonstrate procedures according to this invention for (1) registering an IS-41 terminal roaming in a GSM network, (2) authenticating the roaming terminal, (3) terminating a mobile call, and (4) redirecting a mobile call, respectively.

Figure 10:
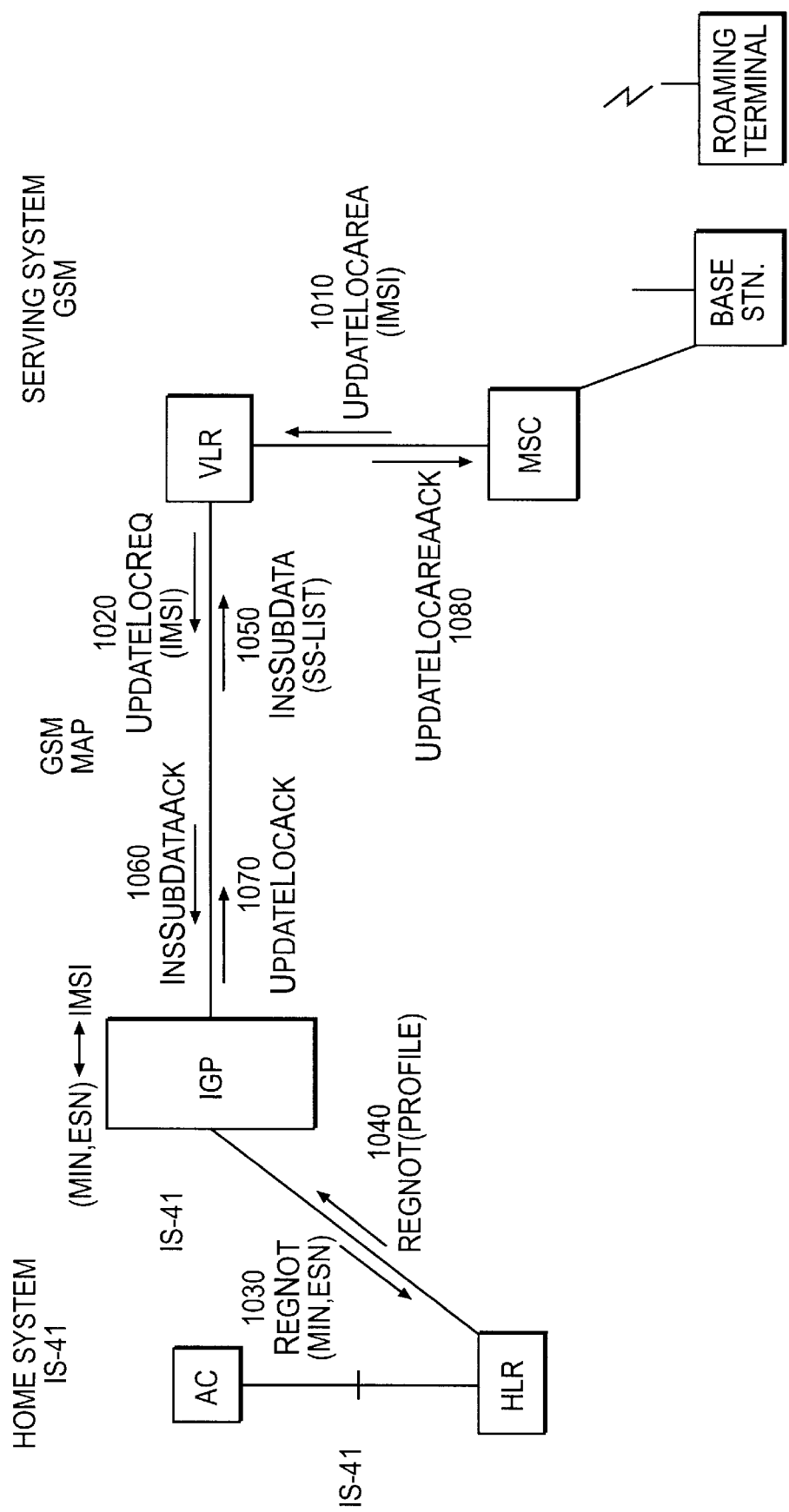
FIG. 10 demonstrates the registration procedure in the system of FIG. 9.

The registration procedure demonstrated by FIG. 10 begins when the roaming terminal realizes that it can no longer communicate with its home network. When this happens, the roaming terminal requests registration from the GSM network using its IMSI to identify itself to the GSM network.

Upon receipt of the registration request, the Serving MSC sends an Update Location Area request (UpdateLocArea) message to the Serving VLR identifying the roaming terminal by its IMSI (1010). The Serving VLR realizes that the roaming terminal is not present in its internal data structures, and sends a Location Update Request (UpdateLocReq) message to the IGP (1020). The Serving VLR determines the IGP's address from the IMSI that the roaming terminal provides to the Serving MSC.

The IGP translates from the IMSI to the MIN,ESN pair. Based on the MIN,ESN pair, the IGP locates the Home HLR for the roaming terminal, and sends to the Home HLR a Registration Notification (RegNot) message identifying itself as the Serving VLR (1030).

The Home HLR updates its location register entry for the roaming terminal, and sends the service profile for the roaming terminal to the IGP in a Registration Request response (regnot) message (1040). The IGP maps the service profile from its IS-41 representation to that of the GSM network, and then updates the Serving VLR data via an Insert Subscriber Data (InsSubData) message (1050).

The Serving VLR updates its internal data structures with the service profile, and acknowledges receipt with an Insert Subscriber Data Acknowledge (InsSubDataAck) message (1060). The IGP then updates its location register entry for the roaming terminal, and sends an Update Location Acknowledge (UpdateLocAck) message to the Serving VLR (1070). The Serving VLR informs the Serving MSC that the registration process has been successful (1080).

Figure 11:
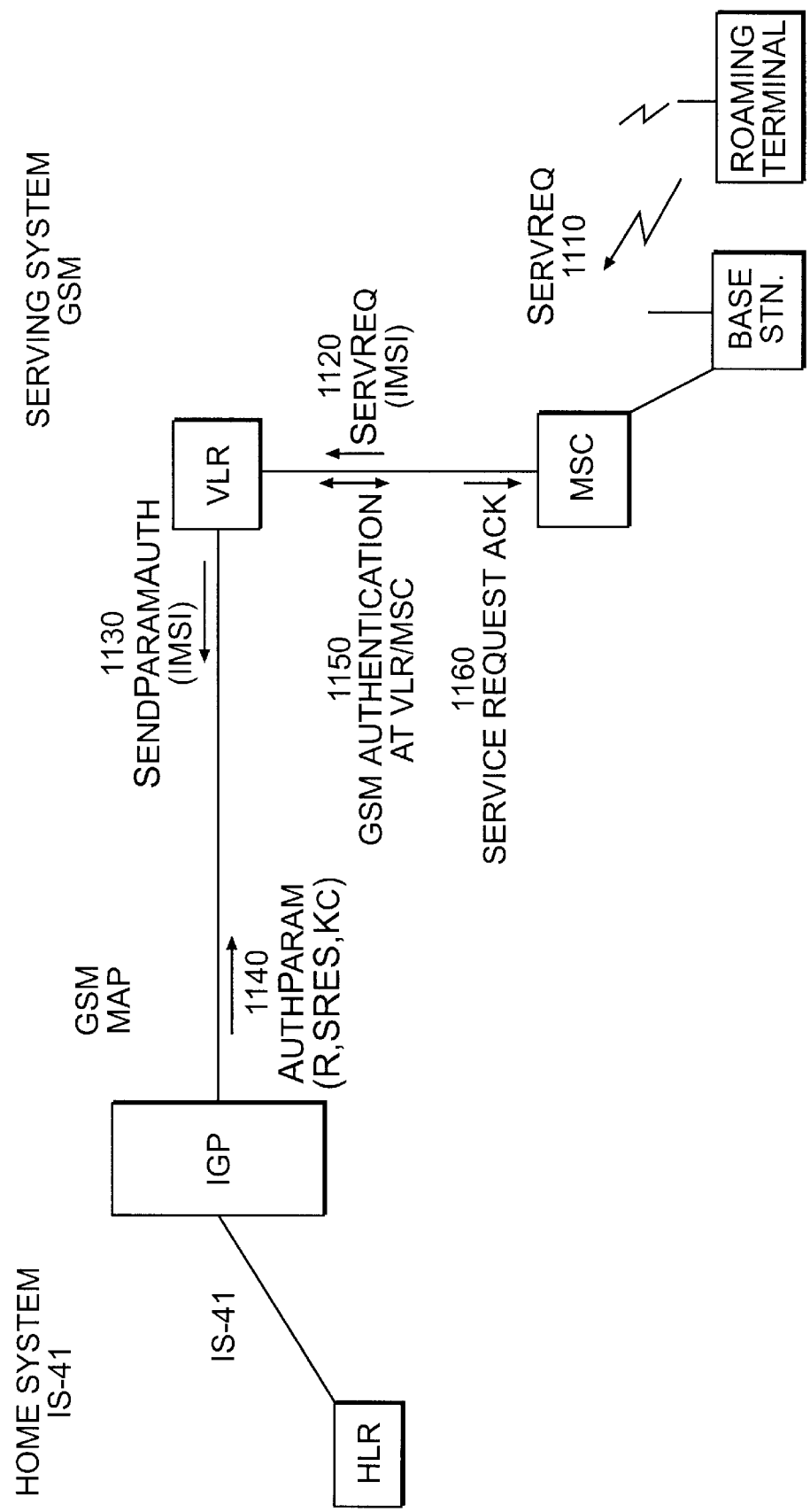
FIG. 11 demonstrates the authentication procedure in the system of FIG. 9.

When the roaming terminal later requests service for, e.g., a registration, an incoming call, or an outgoing call, the authentication procedure demonstrated by FIG. 11 occurs. The IGP stores the parameters and the algorithm (called the A3 algorithm) for GSM authentication. Therefore, the IGP does not interact with the GSM network to authenticate an IS-41 roaming terminal in a GSM network.

The roaming terminal, requiring service, initiates a service request (ServReq) message (1110). Upon receiving the service request, the Serving MSC queries its associated VLR for information or to indicate presence of the roaming terminal (1120).

Based on an internal algorithm, the Serving VLR determines whether the roaming terminal should be authenticated. It also checks its internal data structures to see if authentication triplets (RAND, $K_c$, and SRES) have been previously obtained for the roaming terminal. RAND is a random variable generated by the AuC. $K_c$ is a parameter derived from the parameter $K_i$ and used in ciphering mobile communications.

If authentication triplets are either not stored or have expired, the Serving VLR requests these parameters from the IGP via a Send Parameters for Authentication (SendParamAuth) message identifying the roaming terminal by its IMSI (1130). The IGP executes the A3 algorithm to generate RAND and to calculate SRES and $K_c$, and forwards them to the Serving VLR in a Send Parameters Acknowledge (AuthParam) message (1140). The A3 algorithm is commonly used by the GSM network for authentication so it need not be explained to enable an artisan of ordinary skill to make and use the invention.

The Serving VLR and MSC perform roaming terminal authentication procedures before continuing with the original service request (1150). Upon successful authentication, the Serving MSC continues processing the roaming terminal's original service request (1160).

Figure 12:
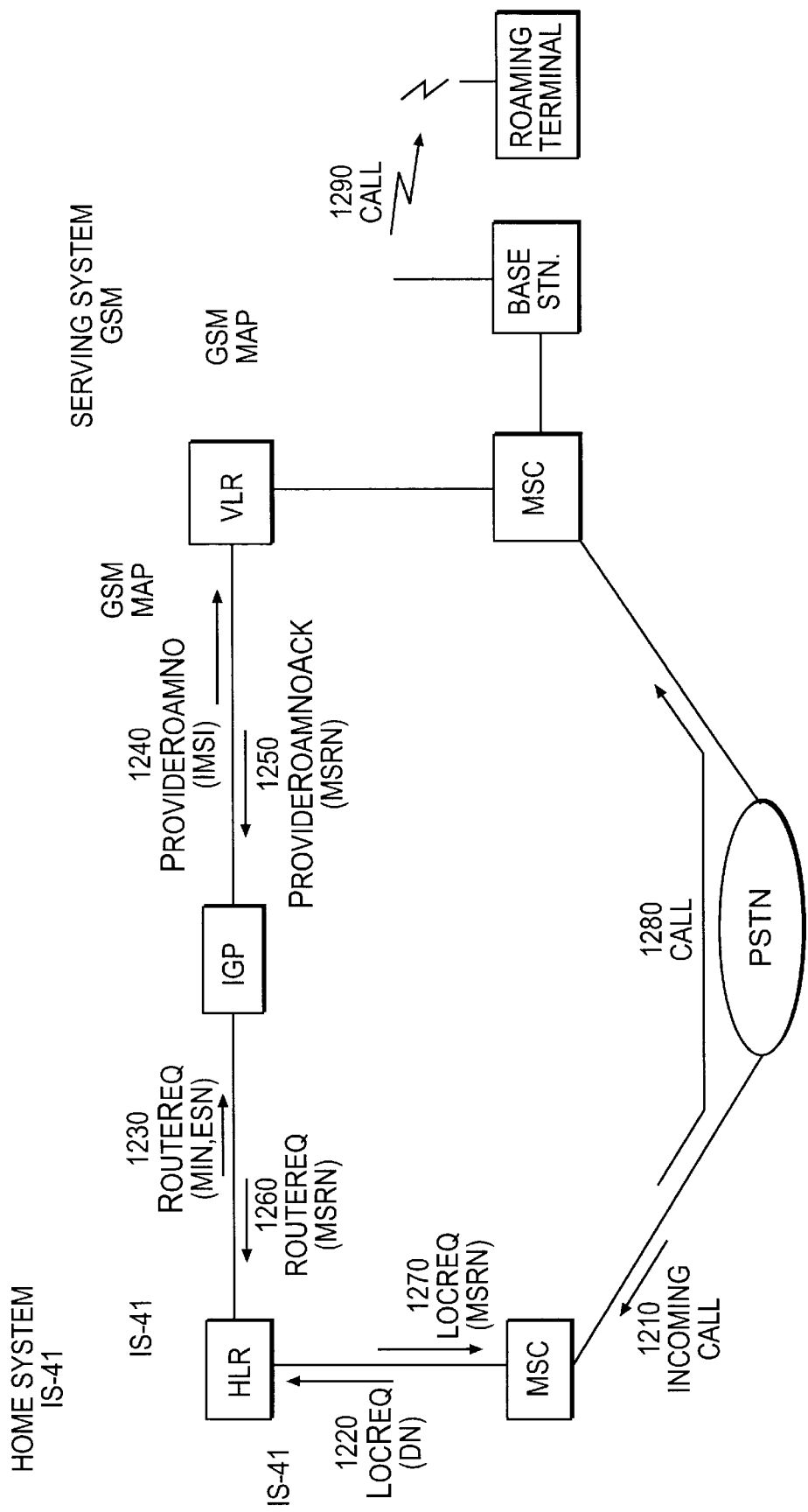
FIG. 12 demonstrates the call termination procedure in the system of FIG. 9.

When an incoming call arrives at the network for the roaming terminal, the mobile call termination procedure of FIG. 12 occurs. Even though the terminal is known to be roaming, an incoming call first arrives at its Home MSC and identifies the roaming terminal by its MIN (1210).

The Home MSC sends a Location Request (LocReq) message to the Home HLR to find the location of the roaming terminal (1220). This message contains either the MIN or, if the Directory Number (DN) is different from the MIN, the DN.

The Home HLR checks its location register entry for the roaming terminal, realizes that the IGP was the last "VLR"

to send a registration request for the terminal, and queries the IGP with a Routing Request (RouteReq) message identifying the roaming terminal by its MIN and ESN. The IGP checks its internal location register for the roaming terminal, performs the necessary mapping between the roaming terminal's MIN,ESN and IMSI, locates the identification of the last Serving VLR, and sends a Roaming Number Request (ProvideRoamNo) message to the Serving VLR (1240).

The Serving VLR allocates a Mobile Station Roaming Number (MSRN) that will enable a call to be routed to the Serving MSC, and returns the MSRN to the IGP in a Provide Roaming Number Acknowledge (ProvideRoamNoAck) message (1250). The IGP forwards the MSRN to the Home HLR in a Routing Request response (routereq) message (1260). The Home HLR then forwards the MSRN to the Home MSC in a Location Request response (locreq) message (1270).

The Home MSC uses the MSRN to route the call to the Serving MSC (1280). Upon receiving the routed call, the Serving MSC associates the MSRN to the IMSI with guidance from the Serving VLR, and forwards the call to the roaming terminal (1290).

Figure 13:
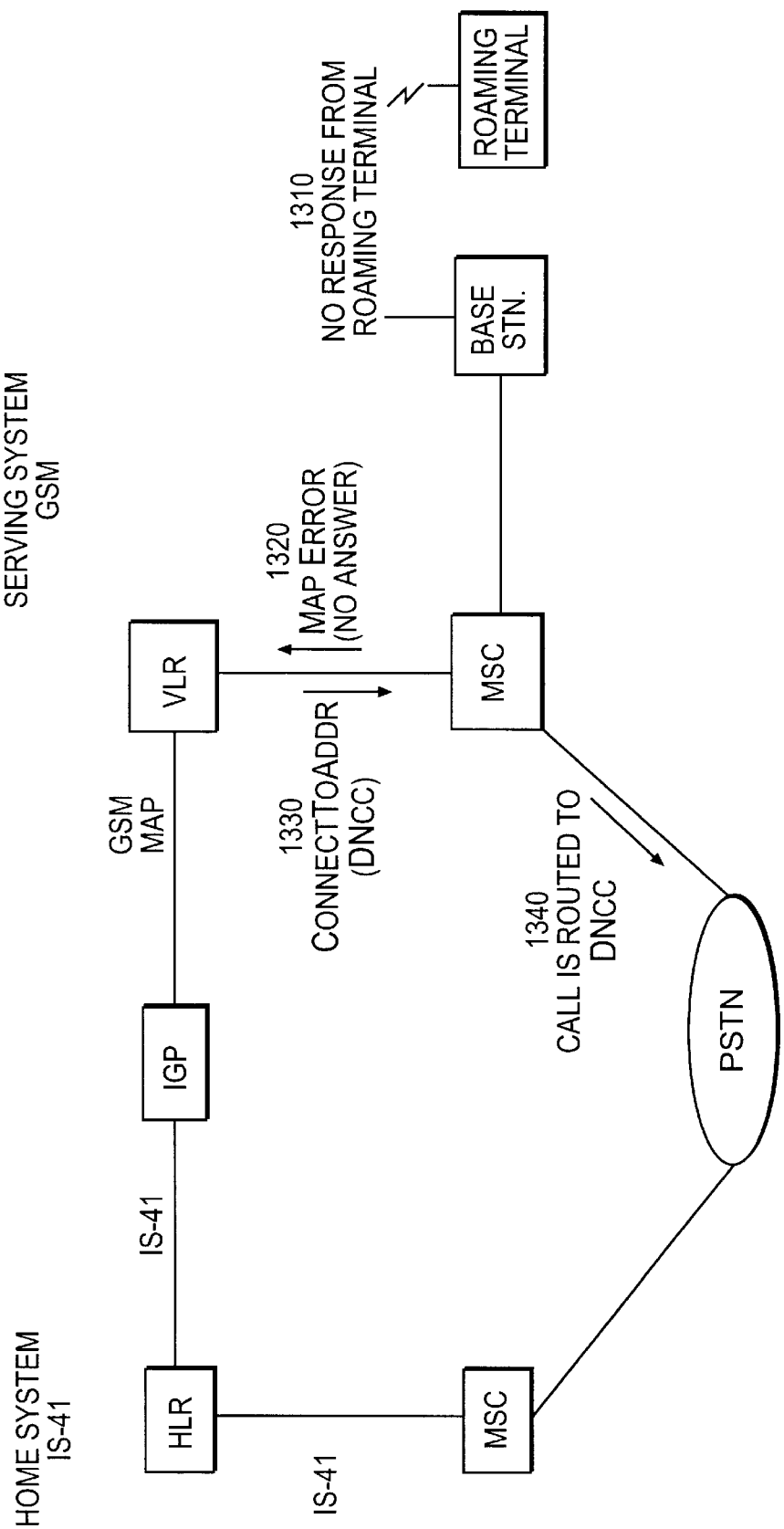
FIG. 13 demonstrates the call redirecting procedure in the system of FIG. 9.

If the roaming terminal fails to respond to the forwarded call, the call redirection procedure demonstrated by FIG. 13 occurs. Unlike the procedure followed when a GSM terminal is roaming in the IS-41 network, the serving system handles call redirection when an IS-41 terminal is roaming in the GSM network.

The procedure demonstrated by FIG. 13 assumes that the Serving VLR has already obtained the service profile including forward-to numbers ($DN_{cc}$). If this information is not already available at the Serving VLR, the Serving VLR requests the service profile from the IGP using a Send Parameters message.

In FIG. 13, the roaming terminal does not respond to paging or fails to answer the forwarded call (1310). If the roaming terminal does not respond or answer for a predetermined amount of time, the Serving MSC informs the Serving VLR of the fact with a Map Error (MapError) (1320).

The Serving VLR checks the service profile for the roaming terminal, realizes that the terminal has registered for and has activated call forwarding service, locates the forward-to number ($DN_{cc}$) for the no-answer condition, and directs the Serving MSC to forward the call by a Connect-To Following Address (ConnectToAddr) message (1330). The Serving MSC routes the call according to the $DN_{cc}$ and releases all resources for the roaming terminal.

As the discussion surrounding FIGS. 9–13 shows, the IGP enables subscribers of the IS-41 networks to roam into GSM networks without affecting the existing network components in either network. Because the IGP performs all inter-network translations, the two networks need only concern themselves with their own operation.

The discussion surrounding FIGS. 4–13 explains the IP of the present invention and how this invention improves inter-technology communication. The present invention avoids the need for an additional MSC (IMSC) dedicated solely to the routing of calls, and thereby simplifies the routing of calls to terminals roaming out of their home service areas.

The foregoing description of a preferred embodiment of the invention has been presented for purposes of illustration and description. It is not intended to be exhaustive or to limit the invention to the precise form disclosed. Modifications and variations are possible in light of the above teachings or may be acquired from practice of the invention. For example, the IP of the present invention need not interface only IS-41 and GSM networks, but can interface any two heterogeneous networks. The scope of the invention is defined by the claims and their equivalents.

What is claimed is:

1. An interworking proxy coupled to first and second mobile switching systems using first and second management protocols, respectively, wherein the first and second management protocols are different, the interworking proxy comprising:

means for receiving a request for service, including one of a registration request for registering a mobile user and a call termination request for forwarding an incoming call to the mobile user, for the mobile user from the first system using the first management protocol;

means for translating the received request from the first management protocol to the second management protocol;

means for sending the translated request to the second system;

means for receiving a response to the translated request from the second system using the second management protocol;

means for translating the received response from the second management protocol to the first management protocol; and means for sending the translated response to the first system.

2. The interworking proxy of claim 1, wherein the first system is a GSM network and the second system is an IS-41 network.

3. The interworking proxy of claim 1, wherein the first system is an IS-41 network and the second system is a GSM network.

4. A method for translating between first and second management protocols in an interworking proxy coupled to first and second mobile switching systems using the first and second management protocols, respectively, wherein the first and second management protocols are different, the method comprising the steps, implemented by the interworking proxy, of:

receiving a request for service, including one of a registration request for registering a mobile user and a call termination request for forwarding an incoming call to the mobile user, for the mobile user from the first system using the first management protocol;

translating the received request from the first management protocol to the second management protocol;

sending the translated request to the second system;

receiving a response to the translated request from the second system using the second management protocol;

translating the received response from the second management protocol to the first management protocol; and sending the translated response to the first system.

5. A method for routing a call to a mobile user from a home system while the mobile user is roaming in a visiting system, the home and visiting systems using different home system and visiting system protocols, respectively, and being connected via protocol converting means, the method comprising the steps of:

receiving the call at the home system;

determining the presence of the mobile user within the home system;

sending a routing number request to the protocol converting means using the home system protocol when the mobile user is not present in the home system;

translating the routing number request from the home system protocol to the visiting system protocol in the protocol converting means;

sending the translated routing number request to the visiting system;

allocating a routing number for the mobile user in the visiting system;

sending the routing number using the visiting system protocol to the protocol converting means;

translating the routing number from the visiting system protocol to the home system protocol in the protocol converting means;

sending the translated routing number to the home system;

routing the call from the home system to the visiting system using the routing number; and forwarding the call from the visiting system to the mobile user located within the visiting system.

6. A method for registering a mobile user from a home system while the mobile user is roaming in a visiting system, the home and visiting systems using different home system and visiting system protocols, respectively, and being connected via protocol converting means, the method comprising the steps of:

receiving a registration request from the mobile user at the visiting system;

sending the registration request using the visiting system protocol to the protocol converting means;

translating the registration request from the visiting system protocol to the home system protocol in the protocol converting means;

sending the translated registration request to the home system;

returning subscriber data in response to the registration request to the protocol converting means from the home system using the home system protocol;

translating the subscriber data from the home system protocol to the visiting system protocol in the protocol converting means; and sending the translated subscriber data to the visiting system.

7. An inter-system roaming interface for routing registration and routing number requests and responses between home and visiting systems for a mobile user from the home system who is roaming in the visiting system, the home system and visiting system using different home system and visiting system protocols, respectively, the inter-system roaming interface comprising:

means for receiving one of a registration request for registering the mobile user and a routing number request for forwarding an incoming call to the mobile user;

means for determining which type of request was received;

means for translating the registration request from the visiting system protocol to the home system protocol, for sending the translated registration request to the home system, for receiving a registration response from the home system in the home system protocol and translating the registration response to the visiting system protocol, and for sending the translated registration response to the visiting system when the determining means determines that the received request is a registration request; and means for translating the routing number request from the home system protocol to the visiting system protocol, for sending the translated routing number request to the visiting system, for receiving a routing number response from the visiting system in the visiting system protocol and translating the routing number response to the home system protocol, and for sending the translated routing number response to the home system when the determining means determines that the received request is a routing number request.

8. The inter-system roaming interface of claim 7, wherein the home system is a GSM network and the visiting system is an IS-41 network.

9. The inter-system roaming interface of claim 7, wherein the home system is an IS-41 network and the visiting system is a GSM network.

10. A network for permitting inter-system roaming, comprising:

a first system including
a first mobile switching center for providing communication with a second system,
a first home location register, coupled to the first mobile switching center, for storing data relating to a location of a first mobile subscriber of the first system roaming in the second system,
a first visitor location register, coupled to the first mobile switching center, for temporarily storing subscription data for a second mobile subscriber of the second system roaming in a service area of the first system, and
first protocol converting means, coupled to the first home location register and a second visitor location register, for translating and forwarding requests and responses between the first system and the second system to provide services to the first mobile subscriber roaming in the second system; and the second system including
a second mobile switching center for providing communication with the first system,
a second home location register, coupled to the second mobile switching center, for storing data relating to a location of the second mobile subscriber of the second system roaming in the first system,
the second visitor location register, coupled to the second mobile switching center and the first protocol converting means, for temporarily storing subscription data for the first mobile subscriber of the first system roaming in a service area of the second system, and
second protocol converting means, coupled to the second home location register and the first visitor location register, for translating and forwarding requests and responses between the second system and the first system to provide services to the second mobile subscriber roaming in the first system.

11. The network of claim 10, wherein the first system is a GSM network and the second system is an IS-41 network.

12. The network of claim 10, wherein the first system is an IS-41 network and the second system is a GSM network.

13. An interworking proxy coupled to first and second mobile switching systems using first and second management protocols, respectively, wherein the first and second management protocols are different, the interworking proxy comprising:

first protocol converting means for translating and forwarding requests and responses between the first system and the second system in the first and second management protocols, respectively, to provide services to a first mobile subscriber from the first system that is roaming in the second system; and second protocol converting means for translating and forwarding requests and responses between the second system and the first system in the first and second management protocols, respectively, to provide services to a second mobile subscriber from the second system that is roaming in the first system.

* * * * *